United States Patent
McCarty et al.

(10) Patent No.: US 7,112,011 B2
(45) Date of Patent: Sep. 26, 2006

(54) HYDRO-PNEUMATIC TENSIONER WITH STIFFNESS ALTERING SECONDARY ACCUMULATOR

(75) Inventors: Jeffery Kirk McCarty, Houston, TX (US); Andrew Campbell Kelly, Akron, OH (US); Joseph William Pallini, Jr., Tomball, TX (US)

(73) Assignee: Vetco Gray Inc., Houston, TX (US)

( * ) Notice: Subject to any disclaimer, the term of this patent is extended or adjusted under 35 U.S.C. 154(b) by 110 days.

(21) Appl. No.: 11/003,051

(22) Filed: Dec. 3, 2004

(65) Prior Publication Data

US 2005/0123359 A1   Jun. 9, 2005

Related U.S. Application Data

(63) Continuation-in-part of application No. 10/685,681, filed on Oct. 15, 2003, now abandoned.

(51) Int. Cl.
*E21B 17/01* (2006.01)
*E21B 19/09* (2006.01)

(52) U.S. Cl. .................. 405/224.4; 405/195.1

(58) Field of Classification Search ............ 405/224.4, 405/224.2, 224, 195.1
See application file for complete search history.

(56) References Cited

U.S. PATENT DOCUMENTS

| | | | |
|---|---|---|---|
| 3,912,227 A | 10/1975 | Meeker et al. | |
| 3,970,292 A | 7/1976 | Dachicourt et al. | |
| 4,222,341 A | 9/1980 | Larsen et al. | |
| 4,272,059 A | 6/1981 | Noerager et al. | |
| 4,367,981 A | 1/1983 | Shapiro | |
| 4,379,657 A | 4/1983 | Widiner et al. | |
| 4,432,420 A | 2/1984 | Gregory et al. | |
| 4,537,533 A | 8/1985 | Hampton | |
| 4,799,827 A | 1/1989 | Jaqua | |
| 4,808,035 A | 2/1989 | Stanton et al. | |
| 4,883,387 A | 11/1989 | Myers et al. | |
| 5,252,004 A | 10/1993 | Butler et al. | |
| 5,366,324 A | 11/1994 | Arlt et al. | |
| 5,658,095 A | 8/1997 | Arlt et al. | |
| 5,846,028 A | 12/1998 | Thory | |
| 6,691,784 B1 | 2/2004 | Wanvik | |
| 6,968,900 B1 * | 11/2005 | Williams et al. | 405/224.4 |
| 7,008,340 B1 * | 3/2006 | Williams et al. | 405/224.4 |

FOREIGN PATENT DOCUMENTS

| | | |
|---|---|---|
| DE | 10251212 A1 | 5/2004 |
| EP | 1428973 A1 | 6/2004 |
| GB | 2180619 A | 4/1987 |

* cited by examiner

*Primary Examiner*—Frederick L. Lagman
(74) *Attorney, Agent, or Firm*—Bracewell & Giuliani LLP

(57) ABSTRACT

A hydro-pneumatic tensioner includes a barrel having an inner bore and a pressurized fluid contained within to form at least part of a primary accumulator having a preset volume of gas at a nominal pressure. A piston having a piston rod extending from an aperture in the barrel is slidably carried in the bore of the barrel and is in communication with the pressurized fluid and positioned to increase the fluid pressure when the piston strokes in the direction of the pressurized fluid. A secondary accumulator also has a preset volume of gas at a preselected pressure. A fluid separator maintains functional separation of the fluid volumes of the primary and secondary accumulators when the primary accumulator pressure is less than the preselected secondary accumulator pressure. The fluid separator allows functional combining of the fluid volumes of the primary and secondary accumulators when the primary accumulator pressure equals or is greater than the preselected secondary accumulator pressure.

39 Claims, 7 Drawing Sheets

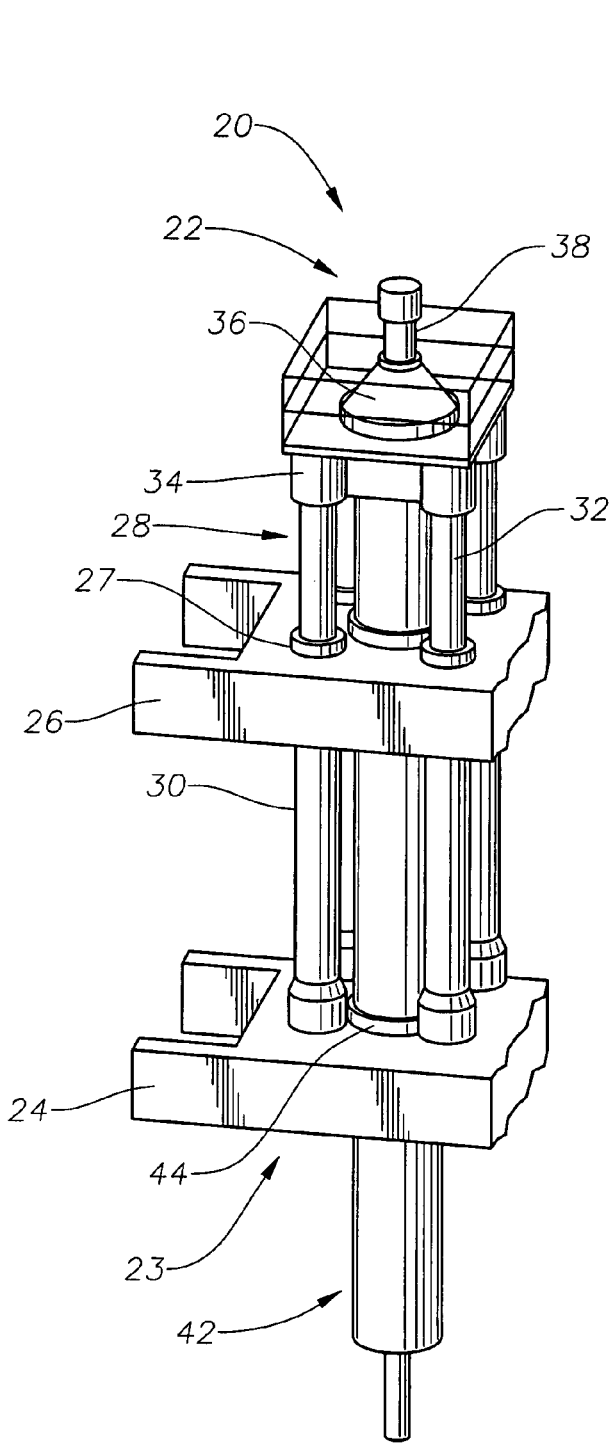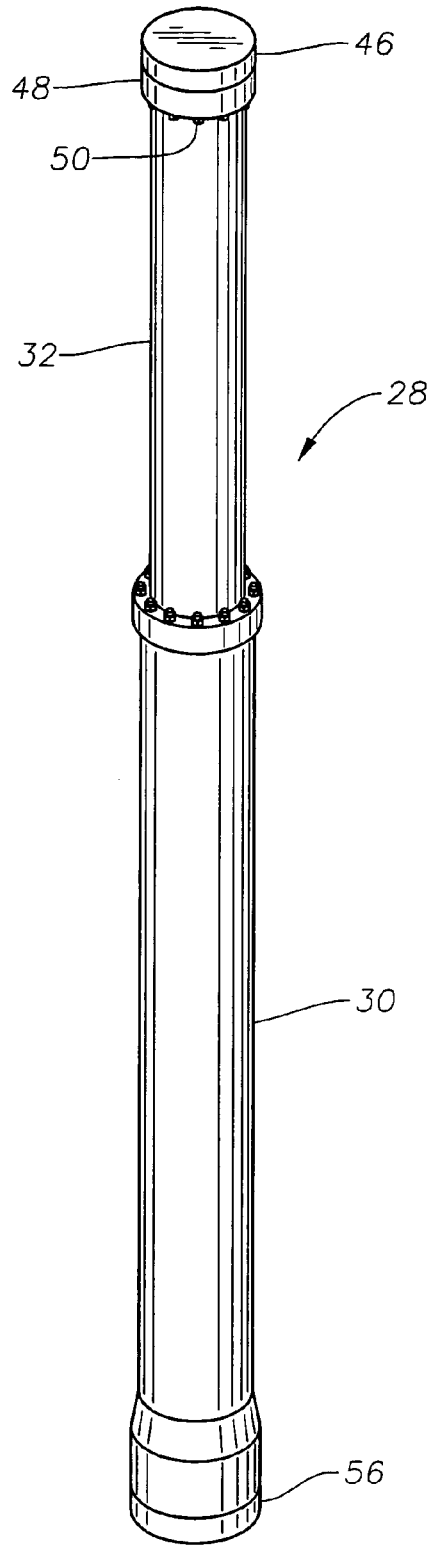
Fig. 1
Fig. 2

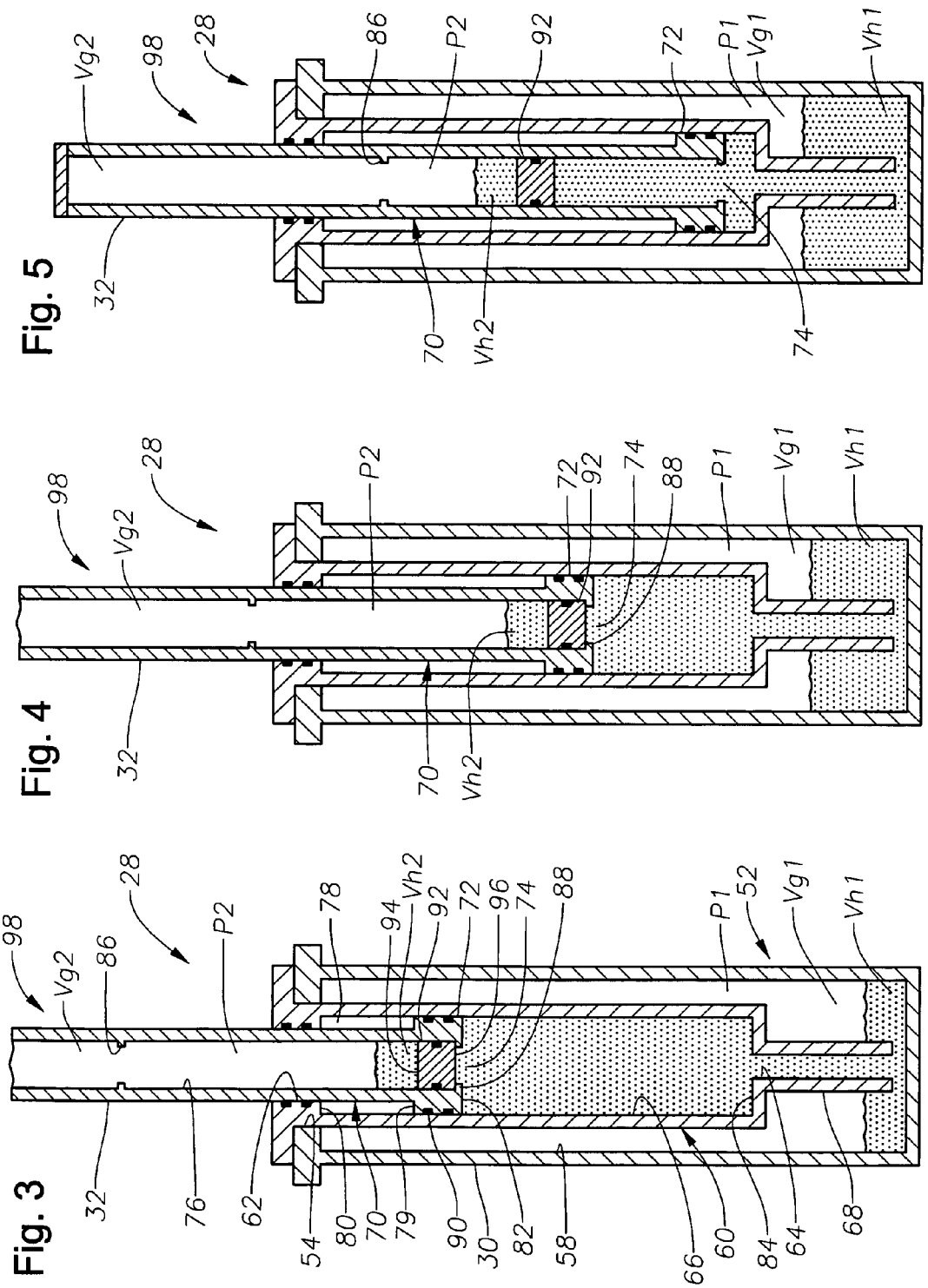

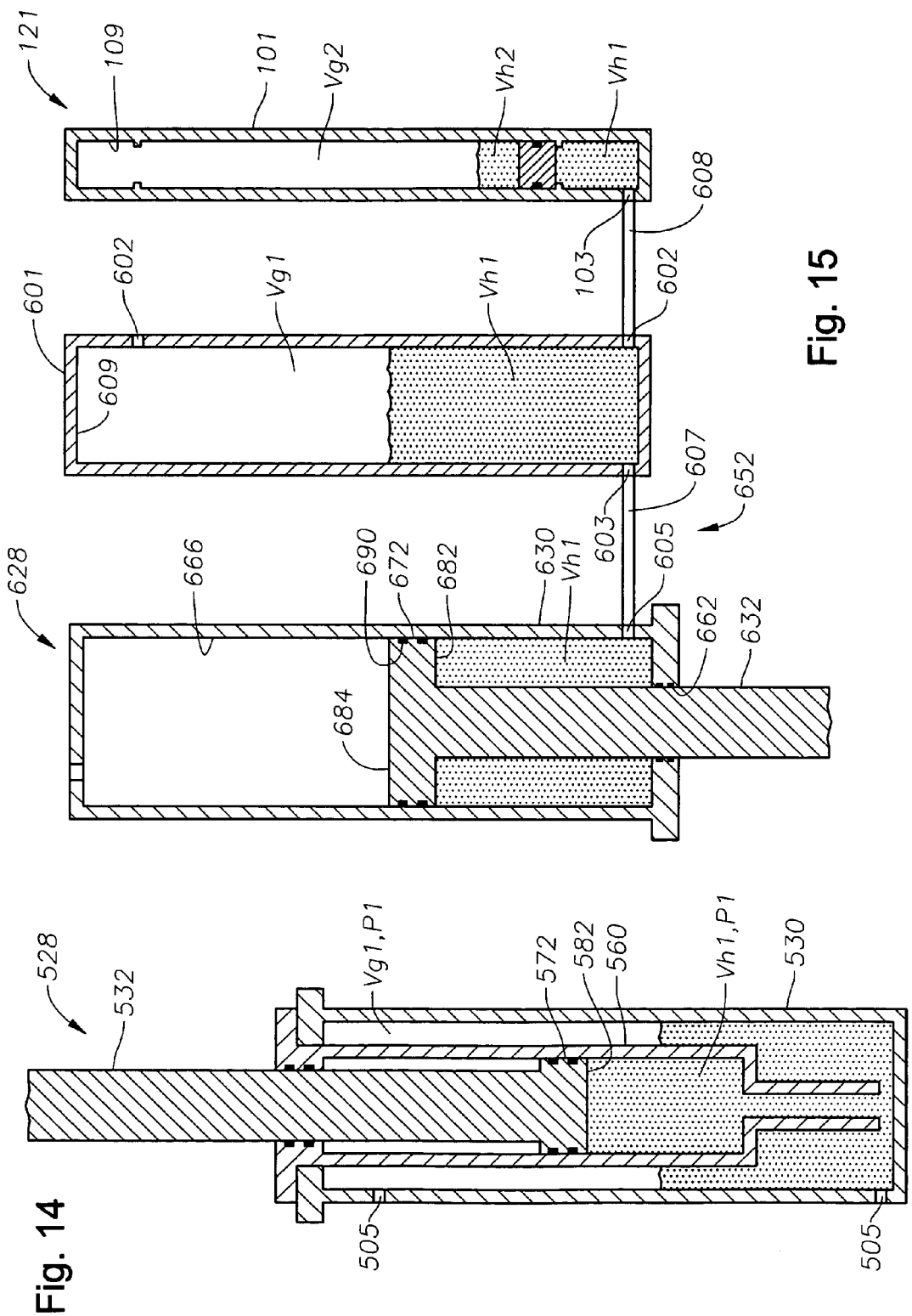

HYDRO-PNEUMATIC TENSIONER WITH STIFFNESS ALTERING SECONDARY ACCUMULATOR

CROSS-REFERENCE TO RELATED APPLICATION

This application is a continuation-in-part of application Ser. No. 10/685,681, filed Oct. 15, 2003, now abandoned.

BACKGROUND OF THE INVENTION

1. Field of the Invention

This invention relates to tensioning of seabed-to-vessel marine risers. More particularly, this invention relates to tensioning the marine risers with a plurality of pneumatic or hydraulic cylinders.

2. Brief Description of the Related Art

A problem presented by offshore hydrocarbon drilling and producing operations conducted from a floating platform is the need to establish a sealed fluid pathway between each borehole or well at the ocean floor and the work deck of the platform at the ocean surface. A riser typically provides this sealed fluid pathway. In drilling operations, the drill string extends through a drilling riser, the drilling riser serving to protect the drill string and to provide a return pathway outside the drill string for drilling fluids. In producing operations, a production riser is used to provide a pathway for the transmission of oil and gas to the work deck.

The riser is projected up through an opening referred to as a moon pool in the vessel to working equipment and connections proximate an operational floor on the vessel. A riser pipe operating on the floating vessel in water depths greater than about 200 feet (34.72 meters) can buckle under the influence of its own weight and the weight of drilling fluid contained within the riser if it is not partially or completely supported. For floating platforms, a special piece of equipment known as a "riser tensioner" is required to maintain each riser within a range of safe operating tensions as the work deck moves relative to the upper portion of the riser. If a portion of the riser is permitted to go into compression, it could be damaged by buckling or by bending and colliding with adjacent risers. It is also necessary to ensure that the riser is not over-tensioned when the vessel hull moves to an extreme lateral position under extreme wave conditions or when ocean currents exert a significant side loading on the riser.

A tension leg platform ("TLP") is a type of marine structure having a buoyant hull secured to a foundation on the ocean floor by a set of tethers. The tethers are each attached to the buoyant hull so that the hull is maintained at a significantly greater draft than it would assume if free floating. The resultant buoyant force of the hull exerts an upward loading on the tethers, maintaining them in tension. The tensioned tethers limit vertical motion of the hull, thus substantially restraining it from pitch, roll and heave motions induced by waves, currents and wind. However, unlike conventional platforms which are rigidly attached to the subsea floor, TLPs are not designed to resist horizontal forces induced by waves.

The marine risers have been tensioned in various manners, including the use of counterweights and pneumatic spring systems. The counterweight was the first technique utilized to apply tension to the top of the marine riser. The weight was hung from a wire rope which was run up through wire rope sheaves and down to an upper portion of the riser pipe. The tension was equal to the counterweight and therefore was practicable only for shallow water that required low tension.

The pneumatic spring systems replaced the counterweight systems as deeper water drilling evolved. The pneumatic tensioning devices stored energy in the form of compressed air to apply tension to the top of the riser through wire ropes. The pneumatic tensioning devices typically involved the use of cylinders from which a piston rod was extended, the piston rod having a sheave engaged by the wire rope to be tensioned. The fluid within the hydraulic cylinder was thereby compressed into an accumulator. The cylinder and the accumulator were normally supported by support structures on the floating vessel.

Many tensioner systems in use today act as oil-damped pneumatic springs. A large gas supply keeps a nearly constant pressure above the oil in a gas-oil accumulator. The oil then provides pressure to the face of the piston. As the vessel heaves, the piston moves up and down against a relatively constant force and the tension lines maintain a relatively constant pull.

Many riser tensioners today utilize hydraulically actuated cylinders with pneumatic pressure accumulators to provide the force necessary to maintain the upper portion of the riser within a preselected range of operating tensions. One implementation is accomplished by the use of sheaves attached to the buoyant drilling structure whereby tensioning cables are run over the sheaves and attached to the riser so that the riser is supported by one end of the tensioning cables. The other end of each tensioning cable is connected to a piston of a hydraulic cylinder. The hydraulic cylinders are connected to a relatively large accumulator which maintains the load applied by the cylinders at a relatively constant level over the full range of travel of the pistons. Thus, as the platform moves vertically, the pistons stroke to maintain a relatively constant upward loading on the riser.

Another type of riser tensioner typically used on TLPs also uses a pneumatically pressurized fluid accumulator but eliminates the cables and sheaves used in earlier riser tensioners. Gas and oil accumulators are connected to the cylinders to control the stroke of pistons. The piston rods are directly attached to a riser tensioning ring which supports the riser.

Both classes of riser tensioning systems described generally require separate and relatively large accumulators to maintain the load applied by the cylinders with an acceptable range. Accordingly, it can be appreciated that there still exists a need for an improved riser tensioner system which provides high-capacity tension and provides for limiting peak loads while incorporating high nominal stiffness, and that does not require an excessively large accumulator.

SUMMARY OF THE INVENTION

In view of the foregoing, an embodiment of the present invention advantageously provides a tensioner unit including a barrel having a bore with pressurized fluid contained within. The barrel forms at least part of a primary accumulator having a preset volume of gas $V_{g1}$ at a nominal pressure $P_1$. The barrel of the tensioner unit also includes an aperture to allow extension and retraction of a piston rod. The tensioner unit also includes a piston slidably carried in the bore of the barrel. The piston has a piston rod that extends from one side of the piston and through an aperture in the barrel. The piston has one of its sides in communication with the pressurized fluid, and is so positioned to increase the pressure P1 of the primary accumulator when the piston strokes in the direction of the pressurized fluid.

The tensioner unit also includes a secondary accumulator having a having a preset volume of gas Vg2 at pressure P2 that is greater than the nominal pressure in the primary chamber. The tensioner unit also includes a control device positioned in a flow path between the primary and secondary accumulators to maintain functional separation of fluid volumes of the primary and secondary accumulators when the primary accumulator pressure P1 is less than the secondary accumulator pressure P2. The fluid separator also allows functional combining of the fluid volumes of the primary and secondary accumulators when the primary accumulator pressure P1 is greater than or equal to the secondary accumulator preselected pressure P2. The control device allows fluid flow from the secondary accumulator back to the primary accumulator until the pressure in the secondary accumulator drops to the preselected pressure P2.

The tensioner unit is configured so that when the primary accumulator pressure P1 is less than the secondary accumulator pressure P2, the effective total gas volume VgT available to the tensioner to maintain tension on a supported system, such as a riser system, is substantially equivalent to the primary accumulator gas volume Vg1. Correspondingly, when the pressure P1 is greater than or equal to the secondary accumulator pressure P2, the effective total gas volume VgT available to the tensioner to maintain tension on the supported system equals the sum of the primary accumulator gas volume Vg1 plus the secondary accumulator gas volume Vg2. This provides for reduced stiffness and reduced maximum tension applied by the tensioner unit to a supported system when the system is directing a maximum load on the tensioner unit.

BRIEF DESCRIPTION OF THE DRAWINGS

So that the manner in which the features, advantages and objects of the invention, as well as others which will become apparent, are attained and can be understood in more detail, more particular description of the invention briefly summarized above may be had by reference to the embodiment thereof which is illustrated in the appended drawings, which drawings form a part of this specification. It is to be noted, however, that the drawings illustrate only a preferred embodiment of the invention and is therefore not to be considered limiting of its scope as the invention may admit to other equally effective embodiments.

FIG. 1 is a perspective view of a hydro-pneumatic tensioner system in accordance with the invention.

FIG. 2 is an enlarged perspective view of one of the hydro-pneumatic tensioner units of the hydro-pneumatic tensioner system of FIG. 1.

FIG. 3 is a schematic view of the hydro-pneumatic tensioner unit of FIG. 1 and having an internal secondary accumulator.

FIG. 4 is a schematic view of the tensioner unit of FIG. 3, shown in a mid-point position.

FIG. 5 is a schematic view of the tensioner unit of FIG. 3, shown in a retracted position.

FIG. 14 is a schematic view of another tensioner unit suitable for use with a secondary accumulator.

FIG. 15 is a schematic view of another tensioner unit having an external secondary accumulator.

DETAILED DESCRIPTION OF THE PREFERRED EMBODIMENT

Figure 7:
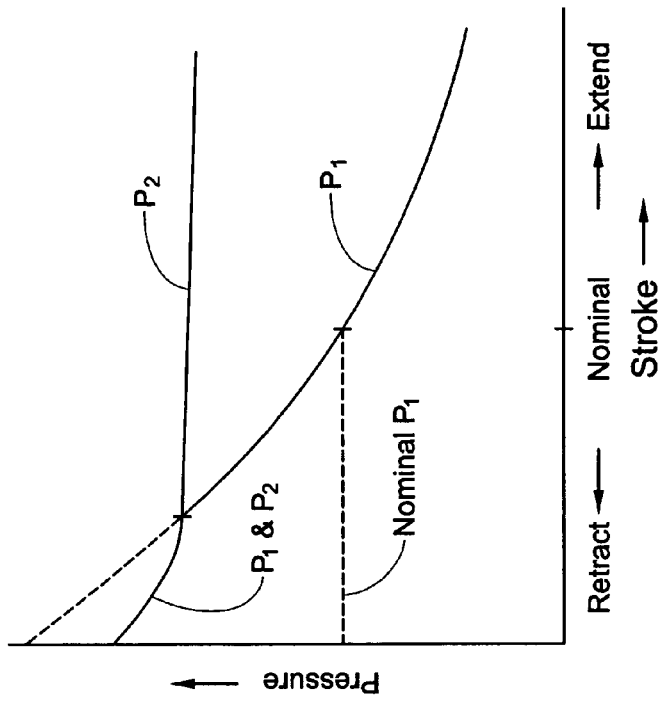
FIG. 7 is a graph of stroke distance versus pressure for all of the embodiments of the tensioner units of this invention.

The present invention will now be described more fully hereinafter with reference to the accompanying drawings which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout, and the prime notation, if used, indicates similar elements in alternative embodiments.

Referring to FIG. 1, shown is a hydro-pneumatic riser tensioner system 20 for maintaining a riser system within a range of safe operating tensions as a work deck or platform moves relative to the upper portion of the riser system. The system 20 advantageously provides a methodology for incorporating high nominal stiffness while limiting peak loads at extreme up and down strokes. More specifically, the system 20 includes a riser system 22, extending between a floating vessel having an operational platform 24, 26, and the sea bottom (not shown).

The riser system 22 is supported in tension at its upper end to prevent the riser system 22 from buckling due to its own weight. The upward tension is maintained within acceptable limits over a typical platform deviation range by the hydro-pneumatic riser tensioner system 20. The riser tensioner system 20, discussed in detail below, includes a plurality of hydro-pneumatic tensioner units 28. The tensioner units 28 include a main body or housing 30, typically tubular shaped, stationarily located between support frames 24, 26, of a support module 23. Each tensioner unit 28 includes a hydro-pneumatic ram tensioner piston rod 32 attached at its upper end to a riser tensional mount or top plate 34, which includes a riser tensional ring 36. The riser tensional ring 36 engages a tension joint 38 of the riser system 22. The hydro-pneumatic ram tensioner piston rod 32 telescopes relative to housing 30 in response to movement of the operational platform.

Referring now to FIGS. 1 and 2, in a typical implementation of the hydro-pneumatic tensioner system 20, typically each hydro-pneumatic tensioner unit upper section is attached to the top plate 34, and the lower section is connected to the support module lower support frame 24, with each unit 28 protruding through an aperture 27 in the upper support frame 26 of the support module 23. In this implementation, the riser system 22 includes a riser conductor 42 and roller assemblies 44 on lower and upper support frames 24, 26 of the support module 23 to provide for axial movement of the support module 23 with respect to the riser system 22.

In this embodiment, as the support module 23 shifts position with respect to the riser system 22, the riser system 22 slides up and down through the roller assemblies 44 and is engaged with tension from the hydro-pneumatic riser tensioner system 20 through the tensioner units 28 applying tension to the top plate 34. The top plate 34 via the mounting ring 36 translates the tension from the tensioner units 28 to the tension joint 38 of the riser system 22.

Referring now to FIG. 2, as stated, the hydro-pneumatic riser tensioner system 20 includes a plurality of hydro-pneumatic tensioner units 28. Each of the units 28 has an upper end and a lower end. The upper end can include a rod end cap 46. The rod end cap 46, and thus the upper end of each unit 28 can be connected to the top plate 34 (FIG. 1) to provide the requisite tension to the tension ring 36 (FIG. 1) and thus to the riser system 22. The rod end cap 46 is shown as threadingly attached to a shoulder or flange 48 formed of or attached to the main body of piston rod 32 using a plurality of bolts 50, each affixed in a bolt cavity (not shown). However, any appropriate attachment or sealing methodology known by those skilled in the art is appropriate and within the scope of the invention. In an embodiment, the lower end of the tension unit 28 is connected to the operational marine platform (not shown). In another embodiment, the lower end of the units 28 is connected to a lower platform or frame 24 of a hydro-pneumatic tensioner support module 23 (FIG. 1).

Referring to FIG. 3 for illustrative purposes only, the tensioner unit 28 includes a barrel 60 in a main body 30. Barrel 60 has a bore 66 and an aperture 62 on at least one end and having a pressurized fluid contained within. Barrel 60 and main body 30 form a primary accumulator 52 having a preset volume of gas Vg1 at pressure P1. A piston assembly 70 strokes in bore 66 of barrel 60. Piston assembly 70 has a piston 72 and a piston rod 32 that extends from a side of the piston and through aperture 62 of barrel 60. One side 82 of the piston 72 is in communication with the pressurized fluid in primary accumulator 52. Piston 72 is positioned to increase pressure P1 of primary accumulator 52 when the piston 72 strokes in the direction of the pressurized fluid.

In this embodiment, a secondary accumulator housing is defined by piston rod 32 and its inner bore 76, which form at least part of a secondary accumulator having a preset volume of gas Vg2 at pressure P2. A fluid separator or control device, such as floating piston 92 is positioned between the primary and secondary accumulators to maintain functional separation of fluid volumes of the primary and secondary accumulators when the primary accumulator pressure P1 is less than the secondary accumulator pressure P2, and to allow functional combining of the fluid volumes of the primary and secondary accumulators when the primary accumulator pressure P1 is greater than or equal to the secondary accumulator pressure P2. This arrangement results in an effective total gas volume VgT available to the tensioner 28 to maintain tension on a supported system, such as a riser system, to substantially equal the primary accumulator gas volume Vg1 when the primary accumulator pressure P1 is less than the secondary accumulator pressure P2, and to substantially equal the sum of the primary accumulator gas volume Vg1 plus the secondary accumulator gas volume Vg2 when the pressure P1 is greater than or equal to the secondary accumulator pressure P2. The specific details of the various embodiments implementing the above described are further introduced below.

Primary accumulator 52 has a closed upper end 54 and a sidewall 58 that extends to closed lower end 56 (FIG. 2). The combination, as described, along with internal components, described below, form an enclosure. Primary accumulator 52 contains a gas volume Vg1 and a hydraulic volume Vh1. The hydraulic fluid is a lubricant for the various seals of tensioner 28. The sealed enclosure of the primary accumulator 52 forms a gas and hydraulic fluid reservoir. A charging connection (not shown) can be interfaced with the main body 30 of the accumulator 52 to permit intermittent or continuous charging of both the gas and hydraulic volumes Vg1, Vh1, from an external pressure source (not shown).

In the embodiment of FIGS. 3–5, cylindrical barrel 60 is secured sealingly to upper end 54 of accumulator 52. The cylinder barrel 60 has a lower end having a lower fluid inlet aperture 64 in fluid communication with primary accumulator 52. In the example of FIGS. 3–5, barrel 60 includes a lower fluid aperture channel extension 68 which protrudes to a position adjacent the lower end of primary accumulator 52, and provides for fluid communication between the cylindrical barrel inner bore 66 and primary accumulator hydraulic volume Vh1. The length of aperture channel extension 68 is generally formulated for the purpose of ensuring only hydraulic fluid entry into the cylinder barrel inner bore 66, not gas. The length of the channel extension 68 may be established depending upon the operating conditions the unit 28 will be subjected to and the desired ratio of gas Vg1 to fluid Vh1. The combination, as described, along with internal components, described below, form a partial enclosure. The cylinder barrel 60 interfaces and is thus in fluid communication through its lower aperture 68 with the primary accumulator hydraulic volume Vh1. The volume of hydraulic fluid contained within the cylinder barrel 60 is directly dependent upon the gas pressure P1 within the primary accumulator 52 and stroke position of the tensioner piston rod 32.

In this embodiment, piston assembly 70 has an aperture 74 on its lower end and an inner bore 76. The combination, as described above and as to be described below, forms a channel which forms an enclosure of varying size depending on primary accumulator gas pressure P1 and stroke position of the riser tensioner piston rod 32. In this embodiment, preferably the aperture 74 of piston 72 is not the same diameter as bore 76. The piston 72 has an outer diameter substantially equivalent to the inner diameter of the axial inner bore 66 of cylinder barrel 60. Also, preferably, the outer diameter of piston rod 32 is substantially equivalent to the diameter of piston rod aperture 62.

Piston assembly 70 is slidably positioned to telescope from inside the cylinder barrel 60 to provide tension and stiffness to the riser system 22 (FIG. 1). Preferably the outer diameter of piston rod 32 is smaller than the inner diameter of cylinder barrel inner bore 66. This differential diameter between the first piston diameter/cylindrical barrel inner bore diameter and the piston rod main body diameter/piston rod aperture diameter forms a back annulus 78. The back annulus 78 is preferably vented to the atmosphere or through vent lines (not shown) following an appropriate methodology as known by those skilled in the art.

The telescopic range of piston 72 can be limited by stops, described below, which present an upper and lower limit for the travel of piston 72. In the configuration shown in FIGS. 3–5, the differential diameter between the piston rod 32 and first piston 72 form a shoulder 79 on the upper surface of the first piston 72 adjacent its outer circumference. The upper limit is the position where piston upper shoulder 79 contacts the lower surface 80 of the upper end of the cylinder barrel 60. The lower limit is a position where the lower surface 82 of piston 72 contacts the upper surface 84 of the bottom of the cylinder barrel 60.

The piston assembly inner bore 76 interfaces and is in fluid communication through its lower aperture 64 with hydraulic fluid in the cylinder barrel 60, which as previously stated is in communication with primary accumulator hydraulic volume Vh1. The volume of hydraulic fluid entering the piston assembly inner bore 76 adjacent its lower side is directly dependent upon gas pressure P1 within primary accumulator 52, which is directly dependent upon stroke position of the tensioner piston rod 32. The first piston 72 includes seals 90 that slidably engage and seal the bore 66 of barrel 60.

Inner bore 76 of piston assembly 70 forms a housing for a secondary accumulator 98 and encloses a second or floating piston 92. Piston 92 is a control device or a fluid separator and has an upper and lower surface 94, 96. Piston 92 has a diameter that is substantially equal to the diameter of the piston rod inner bore 76 and is slidably carried within the piston rod inner bore 76. In the embodiment shown, piston 92 includes pressure seals that slidingly engage inner bore 76. Piston upper surface 94 in combination with the piston rod inner bore 76 form an enclosure, which along with a gas volume Vg2 and hydraulic volume Vh2, sealingly contained on the upper side 94 of the second piston 92, define secondary accumulator 98, which has a preselected gas pressure P2. In a preferred variation, a charging connection (not shown) is located on piston assembly 70 to permit intermittent or continuous charging of both the gas Vg2 and hydraulic volumes Vh2 from an external pressure source (not shown), depending on the embodiment implemented. In an alternative variation, secondary accumulator 98 may include an interface (not shown) with an external accumulator (not shown) to provide added gas volume Vg2. Although FIGS. 3–5 show use of hydraulic volumes Vh1 and Vh2, primary accumulator 52 and secondary accumulator 98 can be made purely of a gas having volume Vg1 and Vg2, respectively. The use of hydraulic oil or fluid is, however, preferred in this embodiment as it reduces the requirements on the first and second piston high-pressure seals.

Piston rod inner bore 76 can also include a set of stops, 86, 88. Preferably retraction stops 86 are fixedly attached or formed of a protrusion in a position to define the maximum upper travel limit of the second piston 92 and ensure secondary accumulator 98 integrity. Extension stops 88 can be formed within either the inner bore 76 of the piston rod 72 or within or as part of the piston aperture 74. FIGS. 3–5 depict extension stop 88 as formed from part of a lower surface 82 of the first piston 72, which effectively forms the aperture 74 into a two-stage aperture within the first piston 72.

Peak loads or tension on the tensioner unit 28 occurring during a retraction of piston rod 32 are reduced due to the implementation of floating piston 92 within the piston rod 32. Referring to FIGS. 3 and 7, the operator charges secondary accumulator 98 to a preselected pressure P2 and primary accumulator 52 to a preselected nominal pressure that is less than P2. The nominal pressure is selected to provide a desired amount of tension to the riser while the vessel is at an average position relative to the riser. At the nominal position, tensioner 28 is extended partway between the maximum extension and maximum contraction. As shown by the curve in FIG. 7, the pressure in primary accumulator P1 varies from the nominal pressure with wave and current movement causing tensioner 28 to retract and extend. As long as primary accumulator pressure P1 is less than secondary accumulator pressure P2, floating piston 92 remains on lower stop 88 and secondary accumulator pressure P2 remains constant.

If vessel movement causes primary accumulator pressure P2 to exceed accumulator pressure P2, then floating piston 92 moves upward from lower stop 88, as shown in FIG. 5. The pressure in primary accumulator 52 causes the pressure in secondary accumulator 98 to increase to the same level as P1 and follow the curve shown in FIG. 7 until reaching full retraction if necessary. If there were no secondary accumulator 98, the dotted lines in FIG. 7 show that pressure P2 would increase to a much higher level at full retraction than otherwise. As tensioner 28 begins to extend again, fluid flows from secondary accumulator 98 back into primary accumulator 52, and the pressure in the accumulators drops until floating piston 92 contacts lower stop 86 again. At that point, the pressure P2 in secondary accumulator 98 again returns to the preselected level.

While floating piston 92 is free-floating (not pegged against a retraction or extension stop, 86, 88), primary accumulator pressure P1 equals the same pressure P2 as in the secondary accumulator 98, and the total effective gas volume VgT of the unit is effectively increased by the gas volume Vg2 of the secondary accumulator 98. The increase in gas volume provides a slower rate of increase in gas pressure P1 due to the added volume Vg2, and also reduces the peak load or tension of a given downstroke (retraction of piston rod 32). This advantageously allows for the use of a smaller tensioner unit 28. The net effect of the inclusion of the gas volume Vg2 into the total effective gas volume VgT and its deletion when pressure P1 decreases below the preselected pressure P2 is to limit the minimum tension applied to the supported system (FIG. 1) at full extension and to also limit the maximum tension applied at near full retraction.

The following, for illustrative purposes only, is a description of the operation of tensioner unit 28 on riser system of 20 according to an embodiment of the present invention as depicted in FIGS. 3–5. In operation, the hydro-pneumatic tensioner unit 28 maintains the riser system 22 within a range of safe operating tensions as a work deck or platform (not shown) moves relative to the upper portion of the riser system 22. The hydro-pneumatic tensioner system 20 ideally should be in a similar configuration to that shown in FIG. 3. With the hydro-pneumatic tensioner system 20 properly installed, normally, the first piston 72 is established in the vicinity of the upper portion of the cylinder barrel 60, and the second piston 92 is normally established in a contact position with the lower stop 88. In this situation, pressure P1 on the lower side 96 of the second piston 92 is less than the pressure P2 on the upper side 94 of the second piston 92.

In a partial retraction situation, as best shown in FIG. 4, normally, the first piston 72 is established in some mid-range position of the cylinder barrel 60, and the second piston 92 is still normally established in a contact position with the lower stop 88. In this situation, pressure P1 on the lower side 96 of the second piston 92 is still normally less than the pressure P2 on the upper side 94 of the second piston 92 but with a decreased pressure differential (P2–P1) maintaining that position. The total effective gas volume VgT is maintained substantially at that volume of the primary accumulator Vg1. As the piston 72 continues to stroke down (retract)

tension increases at a sufficient rate to provide sufficient support to the riser system 22.

In a near full retraction situation, as best shown in FIG. 5, normally, in a situation where the first piston 72 was operating without the benefit of the added second piston accumulator 98, tension would increase rapidly. The second piston 92, however, having its own "charge" moves upward to maintain the two pressures P1 and P2 in substantial equilibrium unless the upper stop 86 is contacted. Thus, the implementation of the second piston 92, within the piston assembly 70, results in the effective amount of gas VgT being effectively increased over that of Vg1. The increase in gas volume provides a slower rate of increase in gas pressure P1 due to the added volume and also reduces the peak load of a given downstroke (retraction of piston rod 32).

Beginning now with the piston assembly 70 in a fully retracted position (not shown), whereby the pressure in the primary accumulator P1 may exceed that of the secondary accumulator 98 (piston 92 in contact with upper stop 86), as the piston 72 strokes up (extends), the pressure in the primary accumulator P1 decreases until it substantially reaches the pressure of the secondary accumulator P2. At that point, the floating piston 92 becomes evenly loaded on either side (e.g. FIG. 5). As mentioned above, while the floating piston 92 is free-floating, the primary accumulator pressure P1 substantially equals that of the secondary accumulator P2, which results in a total effective gas volume VgT increase by the gas volume of the secondary accumulator Vg2.

Beginning at a near full retraction position, as best shown in FIG. 5, in an extension situation, without the second piston accumulator 98, tensions would decrease rapidly. The second piston 92, however, having its own "charge" moves downward, maintaining the two pressures P1 and P2 in substantial equilibrium until the lower stop 88 is contacted. Thus, as stated previously, due to the implementation of a second piston 92, within the piston assembly 70, the effective amount of gas VgT is effectively increased. The increase in gas volume provides a slower rate of decrease in gas pressure due to the added volume. Once the primary accumulator pressure P1 decreases sufficiently, the second piston 92 is again established in a contact position with the lower stop 88 (e.g. FIG. 4). The increase in stiffness is reduced at near full retraction unless pressure P1 increases above the charging pressure of the secondary accumulator 98. The net effect of increasing the gas volume VgT at the near full retraction positioned to decrease maximum stiffness and to limit the minimum tension applied to the riser system 22 (FIG. 1) at full upstroke (extension of piston rod 32).

Figure 6:
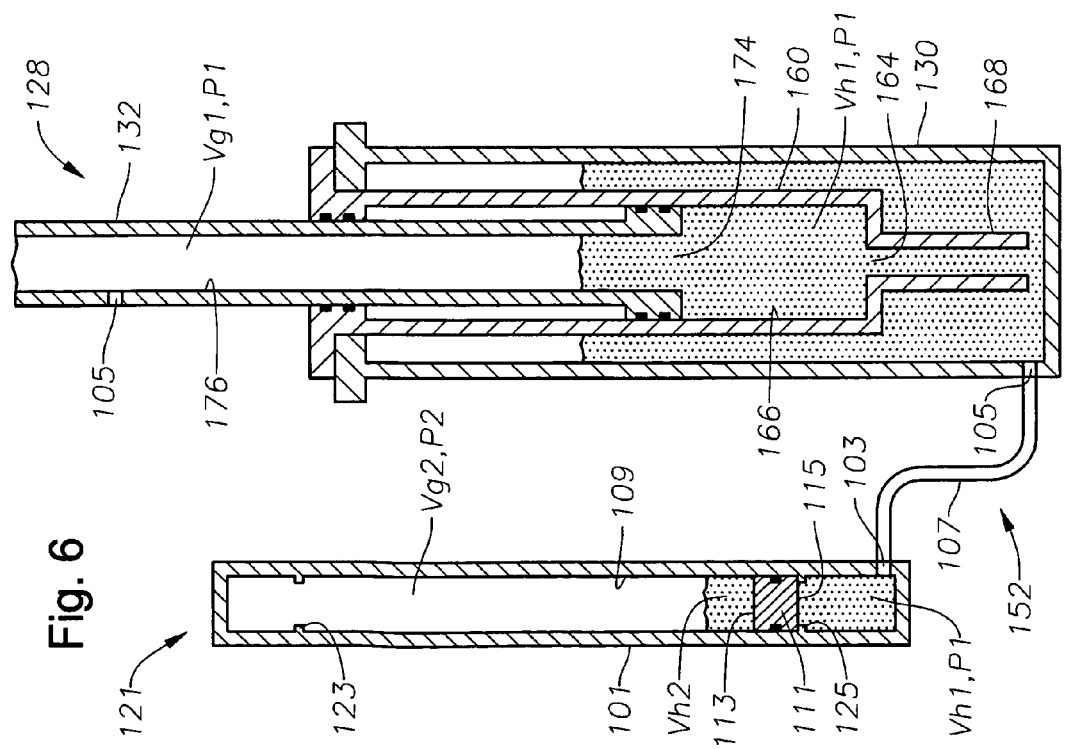
FIG. 6 is a schematic view of an alternate embodiment of a tensioner unit having an external secondary accumulator.

In another embodiment of the present invention, as perhaps best shown in FIG. 6, a tensioner unit 128 similar to the tensioner unit 28 described with respect to FIG. 3 can be modified to remove second piston 92 from bore 76 of piston rod 32. In this embodiment, the piston inner bore 176 also interfaces and is in communication through its lower aperture 164 with hydraulic fluid in the cylinder barrel 160. However, with second piston 92 removed, the pressure and any gas volume within a bore 176 of piston rod 132 is that of the primary accumulator 152. In this embodiment, the gas volume contained within main body 130 and any gas volume contained in piston rod 132 combine to form the primary accumulator gas volume Vg1. The amount of hydraulic fluid entering the piston assembly inner bore 176 adjacent its lower side is directly dependent upon gas pressure P1 within the primary accumulator 152, which is directly dependent upon stroke position of the piston rod 132. Note, although FIG. 6 depicts a gas volume in the bore 176 of piston rod 132, piston rod 132 may be filled entirely with part of the hydraulic volume of the primary accumulator 152. Additionally, bore 176, at for example aperture 174, may be capped so that gas volume Vg1 is contained entirely within main body 130. Also note, if the structure described in FIG. 3 were used to form this embodiment, optional features, such as upper and lower stops, 86, 88, described with respect to FIG. 3 are unnecessary. If installed, however, they do not affect the functional operation of the embodiment as configured and shown in FIG. 6.

In this embodiment, the tensioner unit 128 includes a secondary accumulator 121 having housing 101, separate from the cylinder barrel 160, piston rod 132, and main body 130, which interfaces and is in fluid communication through its aperture 103 with primary accumulator hydraulic fluid Vh1 (or gas Vg1) either in the cylinder barrel 160, piston rod 132, or main body 130 (as shown). Correspondingly, depending on the configuration, either cylinder barrel 160, piston rod 132, or main body 130, can have an aperture 105 and a fluid connection assembly 107, as known and understood by those skilled in the art, to be connected to the aperture 103 of the secondary accumulator housing 101. Preferably, the secondary accumulator housing 101 is in the form of an external cylinder having an inner bore 109. In the configuration shown in FIG. 6, the secondary accumulator housing 101 includes a fluid separator in the form of a floating piston 111. The inner bore 109 encloses the floating piston 111. The floating piston 111 has an upper and lower surface 113, 115, and a diameter that is substantially equal to the diameter of the secondary accumulator housing inner bore 109. The floating piston 111 can include pressure seals that slidingly engage the inner bore 109. The floating piston upper surface 113 in combination with the secondary accumulator housing inner bore 109 form an enclosure, which along with a gas volume Vg2 and a hydraulic volume Vh2, sealingly contained on the upper side 113 of the floating piston 111, define secondary accumulator 121 having a gas pressure P2. The lower side 115 of the floating piston 111 in combination with the secondary accumulator housing inner bore 109 form an additional portion of the primary accumulator 152.

In the preferred configuration, the secondary accumulator housing inner bore 109 includes a set of stops 123, 125. Retraction stops 123 are fixedly attached and form a protrusion to define a maximum upper travel limit of the floating piston 111 and ensure secondary accumulator 121 integrity. Extension stops 125 are formed within the secondary accumulator housing inner bore 109. Under normal conditions, where pressure P2 of the secondary accumulator 121 is greater than the pressure P1 of the primary accumulator 152, the floating piston 111 rests against extension stops 125. As with the embodiment depicted in FIGS. 3–5, the loads occurring during a retraction of the piston rod 32 are reduced due to the implementation of the floating piston 111 within the secondary accumulator housing 101. As with the embodiment described in FIG. 3, either the primary accumulator 152 or the secondary accumulator 121 may include charging connections (not shown) to permit intermittent or continuous charging of both the gas volumes Vg1, Vg2, and hydraulic volumes Vh1, Vh2, from an external pressure source (not shown). In another variation, the secondary accumulator 121 may include an interface (not shown) with another external accumulator (not shown) to provide added gas volume.

Figure 8:
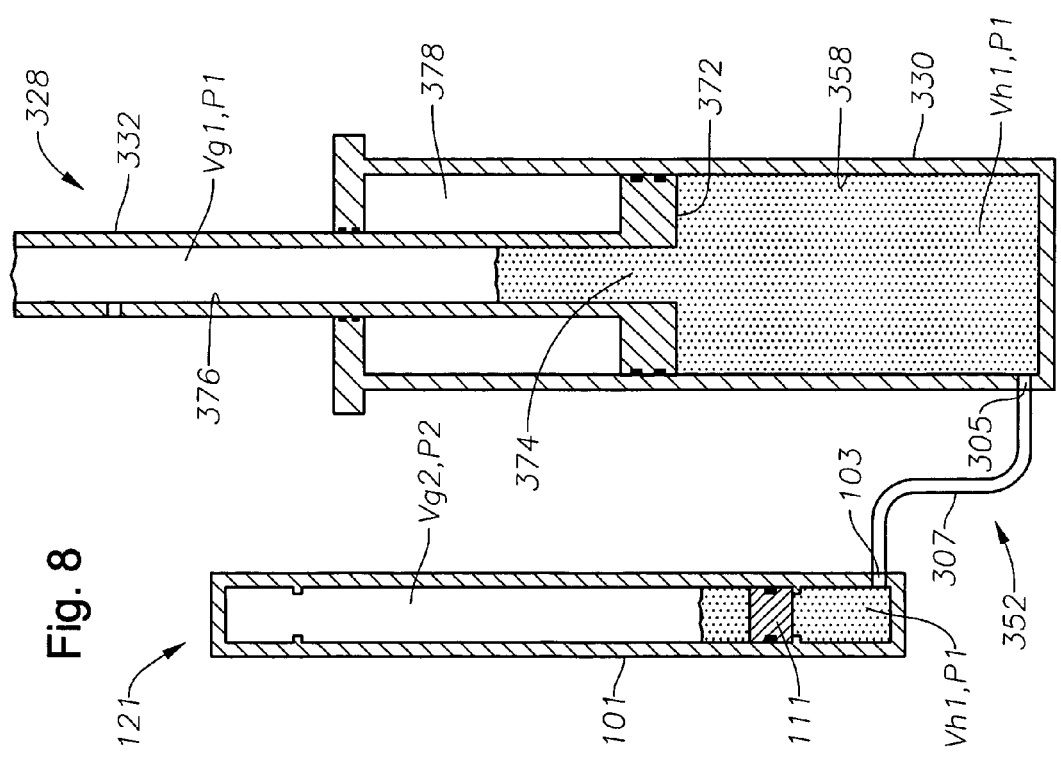
FIG. 8 is a schematic view of another alternate embodiment of a tensioner unit having an external secondary accumulator.

In another embodiment of the present invention, as perhaps best shown in FIG. 8, a tensioner unit 328 similar to the tensioner unit 128 described with respect to FIG. 6 can be modified to either remove inner barrel 160 or to cap the lower end 164 of cylinder barrel 160 and remove the main body (tubular housing) 130 and channel extension 168. If the inner barrel 160 is removed, the diameter of the first piston 172 can be modified so that the outer diameter of piston 372 is substantially equivalent to the inner diameter of the axial inner bore 358 of the main body or barrel 330. Correspondingly, back annulus 378 performs the same function described above and interfaces with the bore 358 of main body 330 instead of bore 166 (FIG. 6) of cylinder barrel 160.

Regardless of the configuration selected, the piston inner bore 376 interfaces and is in communication through its lower aperture 374 with hydraulic fluid in the barrel housing the piston rod 332. The amount of hydraulic fluid entering the piston assembly inner bore 376 adjacent its lower side is directly dependent upon gas pressure P1 within the primary accumulator 352, which is directly dependent upon stroke position of piston 372 and piston rod 332. The gas volume contained within the piston rod 332, however, in the depicted configuration, again solely forms the primary accumulator gas volume Vg1.

Still referring to FIG. 8, the tensioner unit 328 can include secondary accumulator 121 having housing 101, separate from either the main body (bore) 330 and piston rod 332, which interfaces and is in fluid communication through its aperture 103 with primary accumulator hydraulic fluid Vh1 in the main body 330. Correspondingly, the main body 330 has aperture 305 fluidly connected to a fluid connection assembly 307 and to aperture 103 of the secondary accumulator housing 101. The secondary accumulator housing 101 also includes a fluid separator in the form of a floating piston 111, which along with secondary accumulator housing 101 forms an enclosure containing a gas volume Vg2 and hydraulic volume Vh2, which define a secondary accumulator 121, as previously described in detail with respect to the embodiment shown in FIG. 6.

The previous embodiments depict the housing for a secondary accumulator in the form of either a piston rod 32 having inner bore 76 (FIGS. 3–5) or secondary accumulator housing 101 having inner bore 109 and containing within a fluid separator in the form of a floating piston 92, 111, sealingly engaging the inner bore 76, 109, respectively (FIGS. 6–8). Regarding the embodiments described with respect to FIGS. 6 and 8, the floating piston 111 sealingly and slidingly engages inner bore 109 of secondary accumulator housing 101 and functions in a similar manner as floating piston 92, described with respect to FIGS. 3–5 (previously described in detail). Alternative embodiments of the fluid separator in the secondary accumulator are, however, within the scope of the present invention.

Figure 9:
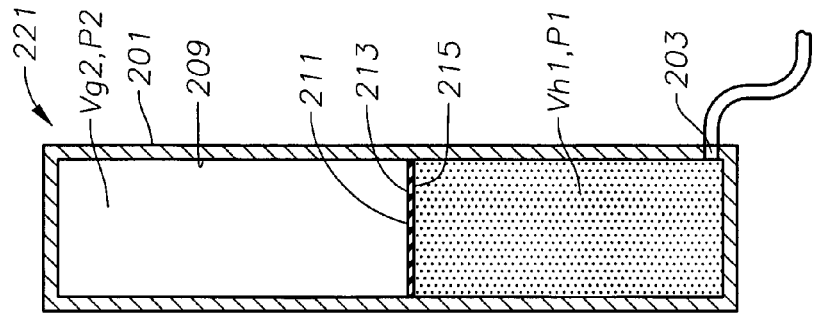
FIG. 9 is a schematic view of another alternate embodiment of an external secondary accumulator for use with the tensioner units of this invention having external secondary accumulators.

For example, as best shown in FIG. 9, the floating piston 92 (FIG. 3) and floating piston 111 (FIGS. 6, 8) can be replaced by a bladder 211 that sealingly engages inner bore 209 of secondary accumulator housing 201 in a fixed position. Similar to the floating piston 111 implementation, upper surface 213 of the bladder 211 in combination with the secondary accumulator housing inner bore 209 form an enclosure, which along with a gas volume Vg2 sealingly contained on the upper side 213 of the bladder 211, define a secondary accumulator 221 having a gas pressure P2. The lower side 215 of the bladder 211 in combination with the secondary accumulator housing inner bore 209 form an additional portion of the primary accumulator through aperture 203.

In operation, bladder 211 is selected to "balloon" when pressure P1 of the primary accumulator equals or exceeds pressure P2 of the secondary accumulator. Hydraulic volume Vh1 having pressure P1 serves to compress bladder 211 at a preselected pressure P2, which, in turn, serves to compress the secondary accumulator gas volume Vg2 to substantially the same extent as that of the hydraulic volume Vh1 having pressure P1 compresses primary accumulator gas volume Vg1. This "ballooning effect" results in functionally combining the gas volume of the primary accumulator Vg1 and with the gas volume Vg2 of the secondary accumulator when the pressure P1 of the primary accumulator equals or exceeds pressure P2 of the secondary accumulator. This results in an increased total gas volume VgT which serves to reduce maximum tension and stiffness during a downstroke of the piston rod. However, as with the configuration described with respect to FIG. 9, secondary hydraulic volume Vh2 would be unnecessary. As stated above, the secondary hydraulic volume Vh2 in the above described embodiments and their corresponding configurations is generally used for the purpose of maintaining hydraulic seals of the floating piston. As the bladder 211 is fixedly mounted, the second hydraulic fluid volume is unnecessary. Note also, the second piston 92 (FIGS. 3–5) can be replaced by a bladder similar to bladder 211 fixedly mounted within bore 76 of piston rod 32.

Figure 10:
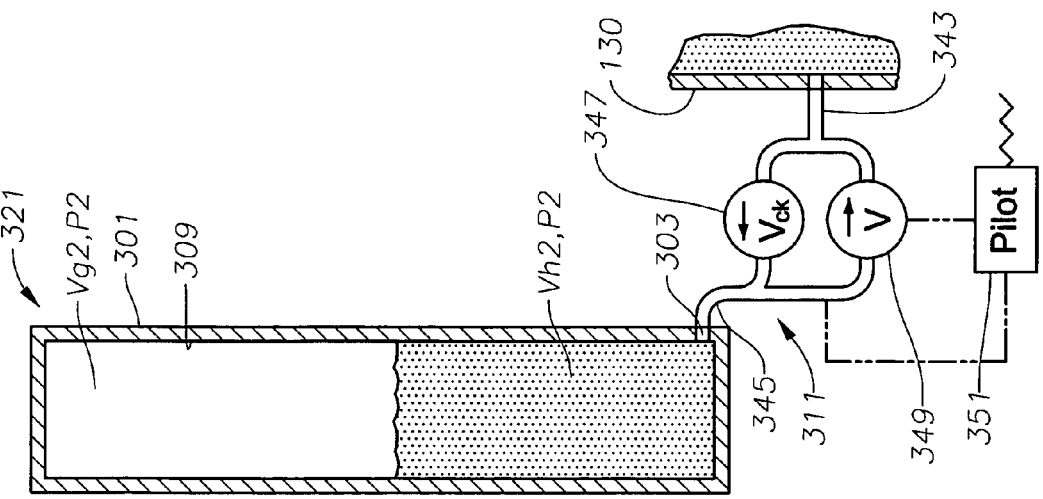
FIG. 10 is a schematic view of another alternate embodiment of an external secondary accumulator for use with the tensioner units of this invention having external secondary accumulators.

As best shown in FIG. 10, the floating piston 111 (FIGS. 6, 8) can also be replaced by a fluid separator or control device in the form of a valve or valve arrangement 311. In this embodiment of the present invention, valve arrangement 311 has a first fluid connection assembly 343 in fluid communication with pressurized fluid in the primary accumulator in housing 130 (FIG. 6) and a second fluid connection assembly 345 in fluid communication with the pressurized fluid contained within secondary accumulator housing 301 through aperture 303. In this example, valve arrangement 311 has a check valve 347 and a pilot valve 349 in parallel. Check valve 347 admits flow from main accumulator housing 130 to secondary accumulator housing 301 if P1 is greater than P2. Pilot valve 349 has a pressure sensor control 351 that allows flow from secondary accumulator housing 301 back into primary accumulator housing 130 only when P2 is greater than P1 and when P2 is above the initial pre-selected pressure for secondary chamber 301. That is, when pressure P1 is above pressure P2 and begins to drop, the pressure in secondary accumulator housing 301 decreases only until reaching the initial preselected pressure. Pressure P1 in primary accumulator housing 130 may continue to drop.

Referring to the configurations shown in FIGS. 6 and 8, when combined with the fluid separator shown in FIG. 10, the interface between the fluid separator and the primary accumulator is with hydraulic volume Vh1. The bore 309 of secondary accumulator housing 101 contains gas volume Vg2 and hydraulic volume Vh2 which, in combination with the second fluid connection assembly 345 of the valve arrangement 311, define a secondary accumulator 321.

In operation, as primary accumulator pressure P1 equals or exceeds secondary accumulator pressure P2, the valve arrangement 311 allows a portion of hydraulic volume Vh1 to enter the secondary accumulator and compress the secondary accumulator gas volume Vg2 to substantially the same extent the hydraulic volume Vh1 having pressure P1 compresses primary accumulator gas volume Vg1. This "effect" results to combine the gas volume of the primary accumulator Vg1 and with the gas volume Vg2 of the secondary accumulator when the pressure P1 of the primary accumulator equals or exceeds pressure P2 of the secondary accumulator. This produces an increased total gas volume VgT which serves to reduce maximum tension and stiffness during a downstroke of the piston rod. As the pressure P1 of the primary accumulator decreases to that of the preselected secondary accumulator pressure P2, the valve arrangement 311 allows substantially the same amount of hydraulic fluid from the primary accumulator hydraulic volume Vh1 equivalent to the amount that entered the secondary accumulator hydraulic volume Vh2 to be returned through the valve arrangement 311 by the expanding secondary accumulator gas volume Vg2. When the primary accumulator pressure P1 decreases below the secondary accumulator preset pressure P2, the two hydraulic volumes Vh1, Vh2, are isolated from each other by valve arrangement 311 and the total equivalent gas volume VgT of the tensioner unit is that of the primary accumulator gas volume Vg1.

As stated above, the previous embodiments shown in FIGS. 3, 6 and 8 and described above in detail, depict a housing for a secondary accumulator combined with a fluid separator either in the form of a piston, bladder, or valve arrangement, functionally engaged through use of a primary accumulator hydraulic volume Vh1. With respect to the embodiments described that utilize a separate external secondary accumulator housing, and with reference to FIGS. 6, 8, little modification to those embodiments need be necessary in order to provide a secondary accumulator which is functionally engaged entirely through use of a gas such as primary accumulator gas volume Vg1.

Figure 11:
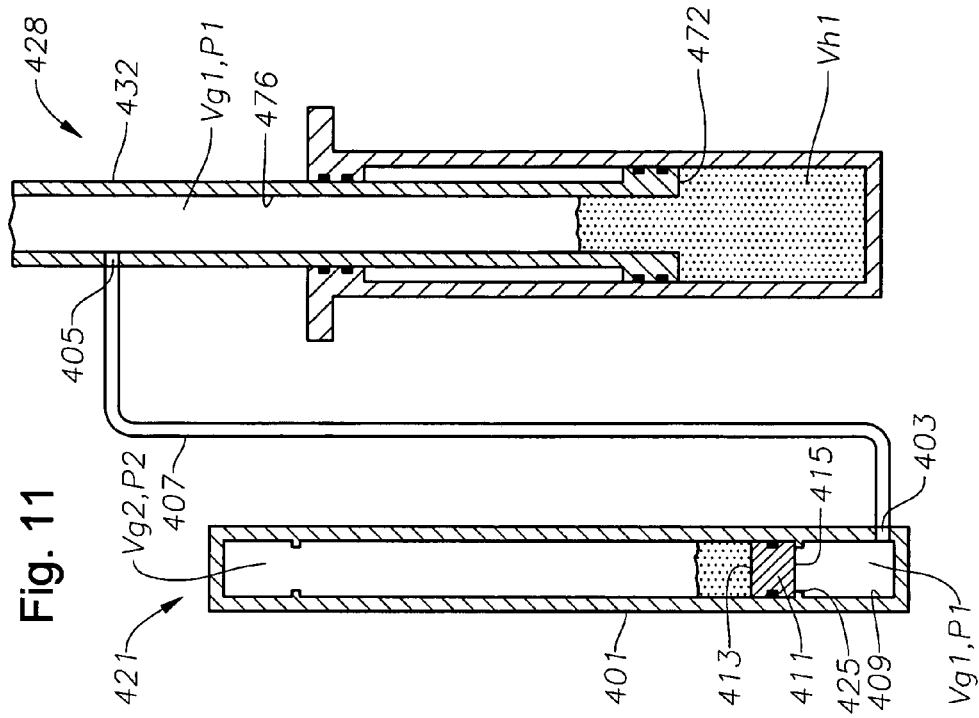
FIG. 11 is a schematic view of another embodiment of a tensioner unit having an external secondary accumulator.
Figure 12:
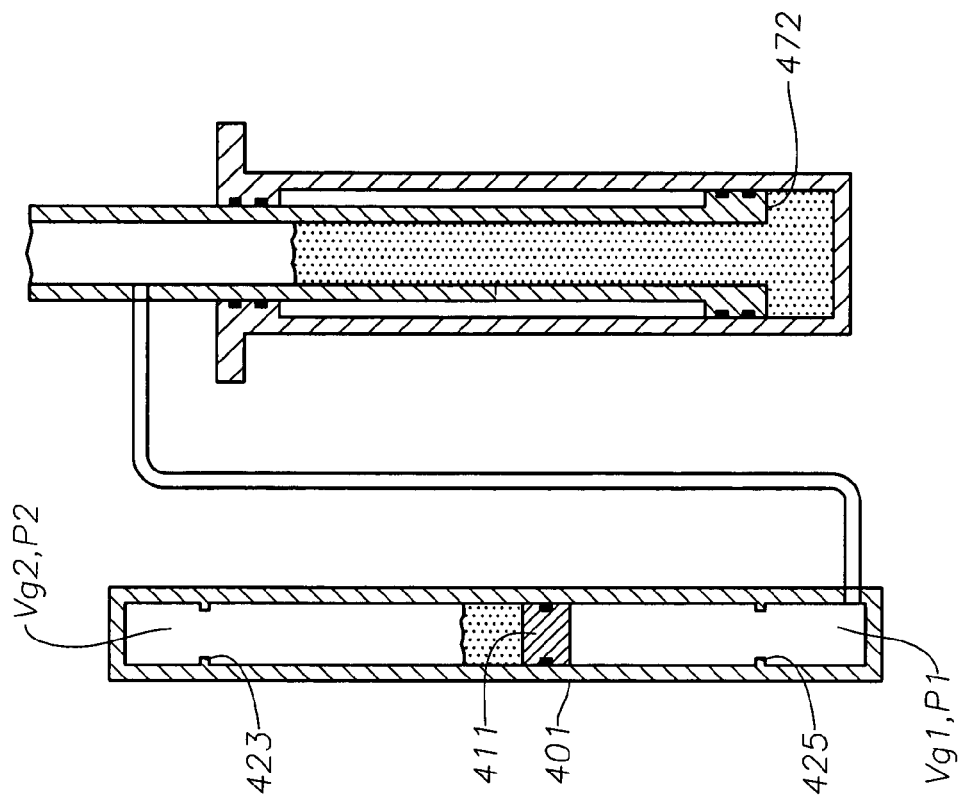
FIG. 12 is a schematic view of the tensioner unit of FIG. 11, shown with the first piston in a mid-point position.
Figure 13:
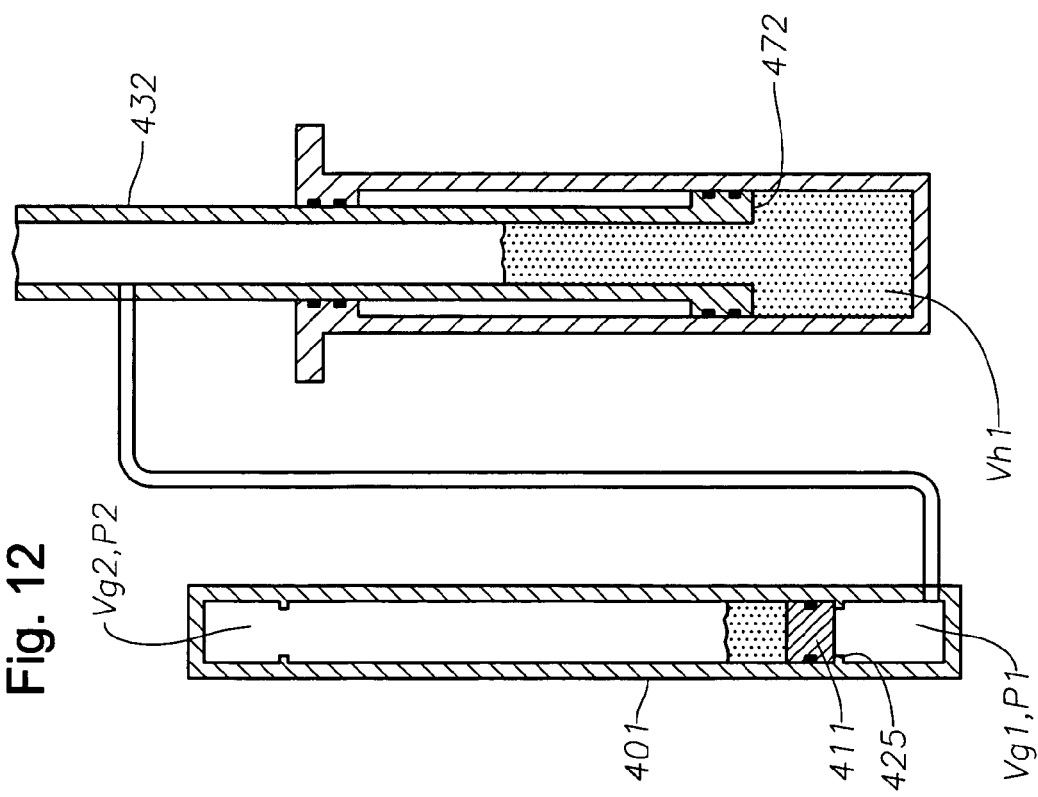
FIG. 13 is a schematic view of the tensioner unit of FIG. 11, shown with the first piston in a retracted position.

Referring to FIGS. 11–13, shown is the implementation of a tensioner unit 428, similar to that described with reference to FIG. 8, having three variations of a secondary accumulator in the form of the gas accumulator. The tensioner unit 428 can have secondary accumulator housing 401 positioned in fluid (gas) communication with either of the previously described embodiments primary accumulator gas volume Vg1. For example, aperture 405 can be located in piston rod 432 to provide primary accumulator pressure P1 to either of the embodiments of a fluid separator, described above. Referring to the implementation of a fluid separator taking the form of a floating piston 411 (FIGS. 11–13), the floating piston 411 performs the same function as floating piston 111 as described with respect to FIG. 6, 8 or floating piston 92 described with respect to FIGS. 3–5. In this configuration, however, the gas volume contained within the bore 476 of piston rod 432, lower side 415 of the floating piston 411 in combination with the secondary accumulator housing inner bore 409, and fluid connection assembly 407 positioned between apertures 403 and 405 combine to form the primary accumulator having the primary accumulator gas volume Vg1. The bore 409 of the secondary accumulator housing 401 in combination with the upper side 413 of floating piston 411 and containing secondary accumulator gas volume Vg2 form the secondary accumulator 421. Optionally some lubricant can be located in secondary accumulator housing 401 for lubricating the seals of floating piston 411. Alternately, the lubricant above floating piston 411 could be eliminated, and gas seals used to seal floating piston 411 in inner bore 409 of the secondary accumulator housing 401.

In operation, with a supported system such as the hydro-pneumatic tensioner system 20 properly installed, normally, the first piston 472 is established in the vicinity of the upper portion of the cylinder barrel 460, and the floating piston 411 is normally established in a contact position with the lower stop 425. In this situation, pressure P1 on the lower side 415 of the floating piston 411 is normally less than the pressure P2 on the upper side 413 of the floating piston 411.

In a partial retraction situation, as best shown in FIG. 12, normally, the first piston 472 is established in some mid-range position of the cylinder barrel 460, and the floating piston 411 is still normally established in a contact position with the lower stop 425. In this situation, pressure P1 on the lower side 415 of the floating piston 411 is still normally less than the pressure P2 on the upper side 413 of the floating piston 411 but with a decreased pressure differential (P2−P1) maintaining that position. The total effective gas volume VgT is maintained substantially at that volume of the primary accumulator Vg1. As the piston 472 continues to stroke down (retract) tension increases at a sufficient rate to provide sufficient support to the supported system.

In a near full retraction situation, as best shown in FIG. 13, normally, in a situation where the first piston 472 was operating without the benefit of the added second piston accumulator 421, tension would increase rapidly. The floating piston 411, however, having its own "charge" moves upward to maintain the two pressures P1 and P2 in substantial equilibrium unless the upper stop 423 is contacted. Thus, the implementation of the floating piston 411 in the external secondary accumulator housing 401 provides the same function as the second piston 92 (FIGS. 3–5) within the piston rod 32. The implementation of the floating piston results in the effective amount of gas VgT being increased over that of Vg1. The increase in gas volume provides a slower rate of increase in gas pressure P1 due to the added volume and also reduces the peak load of a given downstroke (retraction of the piston rod).

Although not shown floating piston 411 (FIGS. 11–13) can be replaced by a bladder similar to bladder 211 in FIG. 9. Further, floating piston 411 could be replacement by a valve arrangement similar to valve arrangement 311 in FIG. 10.

Referring now to FIG. 14, an alternative embodiment, a tensioner unit 528 similar to the tensioner unit 128 (FIG. 6) is modified to prevent primary accumulator hydraulic volume Vh1 or primary accumulator gas volume Vg1 from entering either piston 572, piston rod 532, or both. Piston rod 532 is solid rather than hollow. This embodiment can interface with any of the external secondary accumulators described above (FIGS. 6, 8–13). In the configuration shown in FIG. 14, the primary accumulator includes the inner bore of the main body (barrel) 530 and the lower surface 582 of piston 572 along with the fluid connection assembly and the primary accumulator side of the fluid separator, according to the type of secondary accumulator selected.

In a configuration where the tensioner unit 528 is implemented with a gas-type secondary accumulator, such as those described with respect to FIGS. 11–13, aperture 505 is positioned in the main body 530, above the maximum hydraulic volume fluid line (not shown) corresponding to the level of the primary accumulator hydraulic volume Vh1 within the main body 530 that is external to the cylinder barrel 560 and reached when piston 572 is in full down-stroke. Primary accumulator hydraulic volume Vg1 interfaces with the fluid separator of the selected secondary accumulator to effectively combine the primary accumulator gas volume Vg1 with the selected secondary accumulator gas volume Vg2. In a configuration where the tensioner unit 528 is implemented with a hydraulic-type secondary accumulator, such as those described with respect to FIGS. 6 and 8–10, aperture 505 is positioned below the minimum hydraulic volume fluid line (not shown) corresponding to the level of the hydraulic volume Vh1 within the main body 530 when piston 572 is in full up-stroke. The primary accumulator hydraulic volume Vh1 interfaces with the fluid separator of the selected secondary accumulator to effectively combine the primary accumulator gas volume Vg1 with the selected secondary accumulator gas volume Vg2.

Referring now to FIG. 15, an alternative embodiment of the present invention includes a pull-type hydro-pneumatic tensioner unit 628 having a primary accumulator housing 601 and a secondary accumulator housing including those described above. A piston 672 similar to the one described in FIG. 14 moves axially within main body (barrel) 630 having inner bore 666. The piston 672 has a solid piston rod 632 extending from the lower side 682 of piston 672. Piston rod 632 extends through a piston rod aperture 662 and through high-pressure seals associated with the aperture 662. The piston 672 also includes high-pressure seals 690. The combination, as described above and as to be described below, forms an enclosure of varying size depending upon primary accumulator pressure P1 and stroke position of the piston rod 632.

In the preferred configuration, the diameter of the piston 672 is substantially equivalent to the diameter of the inner bore 666 of main body 630, and the diameter of the piston rod 632 is preferably substantially equivalent to the inner diameter of the diameter of the piston rod aperture 662. The volume formed between the upper side 684 of the piston 672 and the inner bore 666 of the main body 630 forms a low-pressure annulus that is preferably vented to the atmosphere. The volume formed between the lower side 682 of the piston 672 and the main body inner bore 666 forms a portion of the primary accumulator 652 having a portion of the primary accumulator hydraulic volume Vh1. The main body 630 also includes an aperture 605 located adjacent the lower end of the main body to provide fluid communication between the main body portion of the primary accumulator and primary accumulator housing 601. The primary accumulator housing 601 preferably takes the form of an external cylinder or barrel. The primary accumulator housing includes aperture 603 in fluid communication with main body 630 through a fluid connection assembly 607 connected between aperture 603 of the primary accumulator housing 601 and aperture 605 of the main body 630. The bore 609 of the primary accumulator housing 601 includes a portion of the primary accumulator hydraulic volume Vh1. The bore 609 of the primary accumulator housing 601 also includes at least a portion of the primary accumulator gas volume Vg1, depending on the configuration of the selected secondary accumulator. The amount of primary accumulator hydraulic volume Vh1 is dependent upon primary accumulator pressure P1 and stroke position of piston 672.

The tensioner unit 628 according to this embodiment can at least interface with any of the external secondary accumulators described above. For illustrative purposes, the following discussion will be with respect to the secondary accumulator 121 described with respect to FIG. 6. The primary accumulator housing 601 and secondary accumulator housing 101 are in fluid communication through a fluid connection assembly 608 connected to aperture 602 of the primary accumulator housing 601 and aperture 103 of the secondary accumulator housing 101. In this configuration, the primary accumulator 652 includes the inner bore of the main body (barrel) 630 and the lower surface 682 of piston 672, fluid connection assembly 607, the bore 609 of the primary accumulator housing 601, the fluid connection assembly 608, and the bore 109 of secondary accumulator housing 101 in combination with the primary accumulator side of the fluid separator according to the type of secondary accumulator configuration selected. The secondary accumulator 121 includes the inner bore 109 of the secondary accumulator housing 101 and the secondary accumulator side of the fluid separator according to the type of secondary accumulator configuration selected.

The configuration depicted in FIG. 15 includes a hydraulic-type secondary accumulator similar to that described with respect to FIG. 6, whereby primary accumulator hydraulic volume Vh1 provides the impetus to functionally combine the primary accumulator gas volume Vg1 with the secondary accumulator gas volume Vg2 to provide the tensioner unit 628 an effective total gas volume VgT substantially equivalent to that of the sum of the primary accumulator gas volume Vg1 and secondary accumulator gas volume. If a gas-type accumulator is used, such as that described with respect to FIG. 11, the fluid connection assembly 608 would instead be connected to the upper aperture 602 of primary accumulator housing 601 in communication with the primary accumulator gas volume Vg1. Additionally, the maximum amount of primary accumulator hydraulic volume Vh1 can be configured under expected extreme operating conditions not to exceed a level within the bore 609 of the primary accumulator housing 601 to that of communicating with the upper aperture 602. In this configuration, the primary accumulator gas volume Vg1 provides the impetus to functionally combine the primary accumulator gas volume Vg1 with the secondary accumulator gas volume Vg2 to provide the tensioner unit 628 an effective total gas volume VgT substantially equivalent to that of the sum of the primary accumulator gas volume Vg1 and secondary accumulator gas volume Vg2.

The invention has several advantages. The hydro-pneumatic riser tensioner units provide high nominal stiffness while limiting peak loads at extreme extended and retracted positions. In one configuration, the telescopic piston rod of the riser tensioner unit incorporates the bore or annulus of the piston rod as a secondary accumulator and incorporates a floating piston within the annulus of the piston rod. In other configurations, a separate housing having the bore or annulus is used to form the secondary accumulator. The total effective gas volume of the unit is increased by that of the secondary accumulator. During piston compression, the increased effective gas volume results in the load on the riser system increasing at a much lower rate and a reduced peak load. During piston decompression, the increased total effective gas volume results in a slower decrease in pressure and results in limiting the minimum tension applied to the riser system. Correspondingly, a smaller primary accumulator may be utilized.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, optionally, the system could be entirely pressurized by gas only, using a separate lubricant for the seals, as known by those skilled in the art. Also, if full retraction is not required, the retraction stops used in the floating piston configurations could be eliminated. Further, the accumulator could be connected to the riser and the piston rod to the vessel in reverse to what was described. Still further, the tensioner unit can be attached to the top plate at an intermediate point along the barrel rather than at the upper end as shown in figures. Correspondingly the tensioner unit can be connected to the support module lower support frame at an intermediate point along the barrel rather than at the lower end as shown in the figures.

The invention claimed is:

1. A tensioner unit, comprising:
   a barrel having a bore and an aperture on one end and having a pressurized fluid contained within and forming at least part of a primary accumulator, the primary accumulator having a preset volume of gas Vg1 at pressure P1;
   a first piston having a first and second side and slidably carried in the bore of the barrel, the piston having a piston rod that extends from the second side of the piston and through the aperture of the barrel, having one of the sides of the piston in communication with the pressurized fluid, and positioned to increase the pressure P1 of the primary accumulator when the piston strokes in the direction of the pressurized fluid;
   a secondary accumulator housing having a bore and forming at least part of a secondary accumulator, the secondary accumulator having a preset volume of gas Vg2 at preselected pressure P2;
   a fluid separator having first and second sides and positioned between the primary and secondary accumulators to maintain functional separation of fluid volumes of the primary and secondary accumulators when the primary accumulator pressure P1 is less than the secondary accumulator pressure P2, and to allow functional combining of the fluid volumes of the primary and secondary accumulators when the primary accumulator pressure P1 is greater than or equal to the secondary accumulator pressure P2;
   wherein an effective total gas volume VgT available to the tensioner to maintain tension on a supported riser system substantially equals the primary accumulator gas volume Vg1 when the primary accumulator pressure P1 is less than the secondary accumulator pressure P2; and
   wherein the effective total gas volume VgT available to the tensioner to maintain tension on the supported system substantially equals the sum of the primary accumulator gas volume Vg1 plus the secondary accumulator gas volume Vg2 when the pressure P1 is greater than or equal to the secondary accumulator pressure P2.

2. The tensioner unit of claim 1, further comprising a tubular housing surrounding the barrel and having pressurized fluid contained within and forming a part of the primary accumulator, and wherein:
   the piston rod includes a bore which forms the secondary accumulator housing;
   the barrel has a port on one end in fluid communication with the tubular housing;
   the first piston has an opening in fluid communication with the port;
   the bore of the piston rod is in fluid communication with the opening in the piston;
   the fluid separator comprises a second piston having first and second sides and sealingly and slidably carried in the bore of the piston rod;
   the bore of the barrel, the bore of the tubular housing, and the first sides of the first and second piston define the primary accumulator; and
   the bore of the piston rod and the second side of the second piston define the secondary accumulator.

3. The tensioner unit of claim 1, wherein:
   the first piston has an opening in fluid communication with the barrel;
   the piston rod includes a bore in fluid communication with the opening in the piston;
   the secondary accumulator housing is separate from the barrel and is in fluid communication with the second side of the fluid separator; and
   the first side of the fluid separator is in fluid communication with an opening in one of the bore of the piston rod and the bore of the barrel.

4. The tensioner unit of claim 3, wherein:
   the bore of the barrel, the bore of the piston rod, the bore of the secondary accumulator housing, the first side of the first piston, and first side of the fluid separator define the primary accumulator;
   the bore of the secondary accumulator housing and a second side of the fluid separator define the secondary accumulator;
   the fluid separator comprises a second piston sealingly and slidably carried in the bore of the secondary accumulator housing; and
   the bore of the secondary accumulator housing further includes an extension stop spaced from an end of the secondary accumulator-housing which limits maximum travel of the second piston during piston rod extension corresponding to a decrease in primary accumulator pressure P1 below that of the secondary accumulator pressure P2.

5. The tensioner unit of claim 3, wherein:
   the bore of the barrel, the bore of the piston rod, the bore of the secondary accumulator housing, the first side of the first piston, and first side of the fluid separator define the primary accumulator;
   the bore of the secondary accumulator housing and a second side of the fluid separator define the secondary accumulator; and
   the fluid separator comprises a bladder sealingly engaged in a fixed position within the bore of the secondary accumulator housing.

6. The tensioner unit of claim 3, wherein:
   the fluid separator comprises a valve having a first fluid connection assembly in fluid communication with the pressurized fluid in one of the bore of the piston rod and the bore of the barrel, and a second fluid connection assembly in fluid communication with the pressurized fluid in the bore of the secondary accumulator housing;
   the bore of the barrel, the bore of the piston rod, the first side of the first piston, and the first fluid connection assembly of the valve define the primary accumulator;
   the bore of the tubular housing and the second fluid connection assembly of the valve define a secondary accumulator; and wherein
   the valve connects the pressurized fluid in the bore of the barrel with the pressurized fluid in the bore of the secondary accumulator housing when the pressure P1 in the primary accumulator exceeds the preselected pressure P2 of the secondary accumulator.

7. The tensioner unit of claim 1, further comprising a tubular housing surrounding the barrel, the tubular housing having a bore, a fluid communication opening, and pressurized fluid contained within, and forming a part of the primary accumulator, and wherein:
   the secondary accumulator housing is separate from both the barrel and the tubular housing and is in fluid communication with the second side of the fluid separator;
   the first side of the fluid separator is in fluid communication with the tubular housing through the fluid communication opening; and
   the first side of the first piston forms a fluid barrier.

8. The tensioner unit of claim 7, wherein:
the bore of the barrel, the bore of the tubular housing, the bore of the secondary accumulator housing, the first side of the first piston, and first side of the fluid separator define the primary accumulator;
the bore of the secondary accumulator housing and a second side of the fluid separator define the secondary accumulator;
the fluid separator comprises a second piston sealingly and slidably carried in the bore of the secondary accumulator housing; and
the bore of the secondary accumulator housing further includes an extension stop spaced from an end of the secondary accumulator housing which limits maximum travel of the second piston during piston rod extension corresponding to a decrease in primary accumulator pressure P1 below that of the secondary accumulator pressure P2.

9. The tensioner unit of claim 7, wherein:
the bore of the barrel, the bore of the piston rod, the first side of the first piston, the bore of the secondary accumulator housing, and first side of the fluid separator define the primary accumulator;
the bore of the secondary accumulator housing and a second side of the fluid separator define the secondary accumulator; and
the fluid separator comprises a bladder sealingly engaged in a fixed position within the bore of the secondary accumulator housing.

10. The tensioner unit of claim 7, wherein:
the fluid separator comprises a valve having a first fluid connection assembly in fluid communication with the pressurized fluid in the bore of the tubular housing, and a second fluid connection assembly in fluid communication with the pressurized fluid in the bore of the secondary accumulator housing;
the bore of the barrel, the first side of the first piston, the bore of the tubular housing, and the first fluid connection assembly of the valve define the primary accumulator;
the bore of the secondary accumulator housing and the second fluid connection assembly of the valve define the secondary accumulator; and wherein
the valve connects the pressurized fluid in the bore of the tubular housing with pressurized fluid in the bore of the secondary accumulator housing when the pressure P1 in the primary accumulator exceeds the preselected pressure P2 of the secondary accumulator.

11. The tensioner unit of claim 1, further comprising a primary accumulator housing having a bore, a plurality of fluid communication apertures, and having pressurized fluid contained within and forming a part of the primary accumulator, and wherein:
the first side of the first piston forms a fluid barrier;
the primary accumulator housing is separate from the barrel and is in fluid communication with the barrel and the first side of the fluid separator through the fluid communication apertures;
the secondary accumulator housing is separate from the barrel and the primary accumulator housing and is in fluid communication with the second side of the fluid separator; and
the first side of the fluid separator is in fluid communication with the bore of the primary accumulator housing and bore of the barrel through the fluid communication apertures.

12. The tensioner unit of claim 11, wherein:
the bore of the barrel, the first side of the first piston, the bore of the primary accumulator housing, the bore of the secondary accumulator housing, and the first side of the fluid separator define the primary accumulator;
the bore of the secondary accumulator housing and the second side of the fluid separator define the secondary accumulator;
the fluid separator comprises a second piston sealingly and slidably carried in the bore of the secondary accumulator housing; and
the bore of the secondary accumulator housing further includes an extension stop spaced from an end of the secondary accumulator housing which limits maximum travel of the second piston during piston rod extension corresponding to a decrease in primary accumulator pressure P1 below that of the secondary accumulator pressure P2.

13. The tensioner unit of claim 11, wherein:
the bore of the barrel, the first side of the first piston, the bore of the primary accumulator housing, the bore of the secondary accumulator housing, and the first side of the fluid separator define the primary accumulator;
the bore of the secondary accumulator housing and the second side of the fluid separator define the secondary accumulator; and
the fluid separator comprises a bladder sealingly engaged in a fixed position within the bore of the secondary accumulator housing.

14. The tensioner unit of claim 11, wherein:
the fluid separator comprises a valve having a first fluid connection assembly in fluid communication with the pressurized fluid in the bore of the primary accumulator housing which is in communication with the bore of the barrel, and a second fluid connection assembly in fluid communication with the pressurized fluid in the bore of the secondary accumulator housing;
the bore of the barrel, the first side of the first piston, the bore of the primary accumulator housing, and the first fluid connection assembly of the valve arrangement define the primary accumulator;
the bore of the secondary accumulator housing and the second side of the fluid separator define the secondary accumulator; and
the valve connects the pressurized fluid in the bore of the primary accumulator housing and the bore of the barrel with the pressurized fluid in the bore of the secondary accumulator housing when the pressure P1 in the primary accumulator exceeds the preselected pressure P2 of the secondary accumulator.

15. A riser tensioning system having a riser extending between subsea well equipment and a floating vessel having an operational platform engaged with the riser, a tensioner unit comprising:
a barrel having a port on one end;
a first piston slidingly carried in the barrel and having an opening in fluid communication with the port;
a piston rod extending from the barrel and having a bore in fluid communication with the opening in the piston;
a second piston sealingly and slidably carried in the bore of the piston rod;
a primary accumulator in fluid communication with the port and having pressurized fluid therein that communicates with first sides of the first and second piston; and wherein:

the bore of the piston rod and a second side of the second piston define a secondary accumulator containing a pressurized fluid;

the tensioner unit is positioned between the riser and the platform;

a first section of the tensioner unit is connected to the riser; and a second section of the tensioner unit is connected to the platform.

16. The tensioning system of claim 15, wherein the bore of the piston rod of the tensioner unit includes an extension stop which limits maximum travel of the second piston during piston rod extension.

17. The tensioning system of claim 15, wherein the bore of the piston rod of the tensioner unit includes a retraction stop spaced from an end of the piston rod which limits maximum travel of the second piston during piston rod retraction.

18. The tensioning system of claim 15, wherein the primary accumulator of the tensioner unit comprises a tubular housing surrounding the barrel.

19. The tensioning system of claim 15, wherein the tensioner unit further comprises a barrel extension extending from the barrel which provides for fluid communication between the barrel port and the primary accumulator.

20. A tensioner unit, comprising:

a barrel including a bore;

a first piston slidingly carried in the bore of the barrel and having an opening in fluid communication with a pressurized fluid;

a piston rod extending from the barrel and having a bore in fluid communication with the opening in the piston;

a secondary accumulator housing having a bore;

a fluid separator sealingly engaging the bore of the secondary accumulator housing and having a first and a second side to separate a plurality of volumes of fluid;

a primary accumulator in fluid communication with the bore of the secondary accumulator housing through an opening in at least one of the piston rod and barrel and having pressurized fluid therein that communicates with the first side of the first piston and first side of the fluid separator; and the bore of the secondary accumulator housing and a second side of the fluid separator defining a secondary accumulator containing a pressurized fluid within.

21. The tensioner unit of claim 20, wherein the fluid separator comprises a second piston sealingly and slidably carried in the bore of the secondary accumulator housing.

22. The tensioner unit of claim 21, wherein the bore of the secondary accumulator housing further includes an extension stop spaced from an end of the secondary accumulator housing which limits maximum travel of the second piston during piston rod extension corresponding to a decrease in primary accumulator pressure below that of the secondary accumulator pressure.

23. The tensioner unit of claim 20, wherein the fluid separator comprises a bladder sealingly engaged in a fixed position within the bore of the secondary accumulator housing.

24. A tensioner unit, comprising:

a barrel having a port on one end and in communication with a pressurized fluid;

a tubular housing surrounding the barrel and having a bore, an opening, and an aperture on one end;

a piston having a first and second side, slidingly carried in the bore of the barrel, and having a piston rod extending from the barrel on the second side of the piston through the aperture;

a secondary accumulator housing including a bore, an opening in the bore in fluid communication with the opening in the bore of the tubular housing, and a fluid separator sealingly engaging the bore of the secondary accumulator housing and having a first and a second side to separate a plurality of volumes of fluid;

a primary accumulator in fluid communication with the port of the barrel and the opening in the bore of the tubular housing, and having pressurized fluid therein that communicates with the first side of the piston and the first side of the fluid separator; and the bore of the secondary accumulator housing and the second side of the fluid separator defining a secondary accumulator containing a pressurized fluid.

25. The tensioner unit of claim 24, wherein the fluid separator comprises a second piston sealingly and slidably carried in the bore of the secondary accumulator housing.

26. The tensioner unit of claim 25, wherein the bore of the secondary accumulator housing further includes an extension stop spaced from an end of the secondary accumulator housing which limits maximum travel of the second piston during piston rod extension corresponding to a decrease in primary accumulator pressure below that of the secondary accumulator pressure.

27. The tensioner unit of claim 24, wherein the fluid separator comprises a bladder sealingly engaged in a fixed position within the bore of the secondary accumulator housing.

28. A tensioner unit, comprising:

a barrel having a bore, a fluid communication opening, an aperture on one end, and having a volume of pressurized fluid therein;

a first piston having a first and a second side, slidingly carried in the bore of the barrel and having a piston rod that extends from the piston through the fluid communication opening of the barrel;

a primary accumulator housing having a bore, a plurality of fluid communication openings, and in fluid communication with the fluid communication opening of the barrel;

a secondary accumulator housing having a bore, a fluid communication opening, and having a fluid separator sealingly engaging the bore of the secondary accumulator housing, the fluid separator having a first and a second side to separate fluid in the secondary accumulator housing, the secondary accumulator housing further being in fluid communication with the primary accumulator housing through the fluid communication opening of the secondary accumulator housing and one of the fluid communication openings of the primary accumulator housing;

a primary accumulator in fluid communication with the fluid communication opening of the barrel and the fluid communication opening of the secondary accumulator housing and having pressurized fluid that communicates with the first side of the first piston and first side of the fluid separator; and the bore of the secondary accumulator housing and the second side of the fluid separator defining a secondary accumulator containing a pressurized fluid.

29. The tensioner unit of claim 28, wherein the fluid separator comprises a second piston sealingly and slidably carried in the bore of the secondary accumulator housing.

30. The tensioner unit of claim 29, wherein the bore of the secondary accumulator housing further includes a lower stop spaced from an end of the secondary accumulator housing which limits maximum travel of the second piston during piston rod extension corresponding to a decrease in pressure of the primary accumulator below the pressure of the secondary accumulator.

31. The tensioner unit of claim 29, wherein the fluid separator comprises a bladder sealingly engaged in a fixed position within the bore of the secondary accumulator housing.

32. A tensioner unit, comprising:
   a barrel including a bore and an aperture on one end and having a pressurized fluid contained within and forming at least part of a primary accumulator;
   a piston in communication with a pressurized fluid and slidingly carried in the bore of the barrel and having a piston rod that extends from the piston through the aperture;
   a secondary accumulator housing having a bore and a pressurized fluid having a preselected pressure contained within; and
   a valve arrangement between the first and second accumulators that allows pressurized fluid to flow from the primary accumulator to the secondary accumulator when the pressure in the primary accumulator is greater than in the secondary accumulator, and that allows pressurized fluid to flow from the secondary accumulator to the primary accumulator when the pressure in the secondary accumulator is greater than the pressure in the first accumulator and also greater than the preselected pressure, and which blocks pressurized fluid from flowing from the secondary accumulator to the primary accumulator when the pressure in the secondary accumulator drops to the preselected pressure.

33. A method of maintaining a selected range of tension on a riser extending between subsea well equipment and a floating vessel, comprising the steps of:
   providing a barrel having a bore and an aperture on one end, the barrel forming at least part of a primary accumulator;
   mounting a piston slidably in the barrel, the piston having a piston rod extending from the barrel through the aperture;
   providing a secondary accumulator housing having a bore and forming at least part of a secondary accumulator;
   mounting a fluid separator between the primary and secondary accumulators;
   connecting either the piston rod or the barrel to the vessel and the other to the riser;
   applying fluid pressure from the primary accumulator to a first side of the first piston and a first side of the fluid separator;
   applying fluid pressure into the secondary accumulator housing on a second side of the fluid separator until pressure on both sides of the fluid separator equal;
   applying tension to the riser by the force due to pressure of fluid in the primary accumulator, urging the piston rod to extend;
   if vessel moves closer to the subsea equipment, allowing the piston rod to extend farther and allowing the fluid separator to functionally isolate the fluid volume in the secondary accumulator from the fluid volume in the primary accumulator to maintain tension range; and
   if vessel moves farther from the subsea equipment, allowing the piston rod to retract and allowing the fluid separator to functionally combine the fluid volume in the secondary accumulator with the fluid volume in the primary accumulator to maintain tension range.

34. The method of claim 33, further comprising limiting maximum travel of the second piston during piston rod extension by contacting the second piston with an extension stop.

35. The method of claim 33, further comprising limiting maximum travel of the second piston during piston rod retraction by contacting the second piston with a retraction stop.

36. A tensioner unit, comprising:
   a barrel including a bore;
   a piston slidingly carried in the bore of the barrel and having a piston rod extending from the barrel, the barrel and the piston defining a primary accumulator containing a pressurized fluid;
   a secondary accumulator containing a pressurized fluid at a preselected pressure;
   a communication path between the primary and secondary accumulators for flow of the pressurized fluids between the primary and secondary accumulators;
   a control device in the communication path that allows flow from the primary accumulator into the secondary accumulator if the pressure in the primary accumulator exceeds the preselected pressure in the secondary accumulator;
   the control device allowing flow from the secondary accumulator into the primary accumulator if the pressure in the secondary accumulator is greater than the preselected pressure and greater than the pressure in the primary accumulator; and
   the control device blocking flow from the secondary accumulator into the primary accumulator when the fluid in the secondary accumulator is at the preselected pressure.

37. The tensioner unit according to claim 36, wherein the control device comprises:
   a floating piston within the secondary accumulator that separates pressurized fluid in the secondary accumulator from pressurized fluid in the primary accumulator, the floating piston being movable in a first direction that increases the effective volume of the primary accumulator and in a second direction that decreases the effective volume of the primary accumulator; and
   a stop in the secondary accumulator that prevents further movement of the piston in the second direction when the pressure in the secondary accumulator reaches the preselected pressure.

38. The tensioner unit according to claim 36, wherein the control device comprises:
   a check valve that allows flow from the primary accumulator to the secondary accumulator only when the pressure in the primary accumulator is greater than the pressure in the secondary accumulator; and
   a pilot-controlled valve that allows flow from the secondary accumulator to the primary accumulator only when the pressure in the secondary accumulator is greater than the preselected pressure and greater than the pressure in the primary accumulator.

39. A method of maintaining a selected range of tension on a riser extending between subsea well equipment and a floating vessel, comprising:

connecting one end of a tensioner to the riser and the another end to the floating vessel, the tensioner having a piston slidably carried in a barrel, defining a primary accumulator;

providing a secondary accumulator in fluid communication with the primary accumulator;

pressurizing the primary accumulator with a compressible fluid to a nominal pressure to apply tension to the riser;

pressurizing the secondary accumulator with a compressible fluid to a preselected pressure greater than the nominal pressure;

causing the tensioner to retract and extend due to movement of the vessel relative to the riser, the retraction and extension causing the pressure in the primary accumulator to increase and decrease from the nominal pressure;

preventing any change in the preselected pressure in the secondary accumulator during the retraction and extension as long as the pressure in the primary accumulator remains below the preselected pressure;

if the vessel movement causes the pressure in the primary accumulator to exceed the preselected pressure in the secondary accumulator, flowing fluid from the primary accumulator into the secondary accumulator, causing the pressure in the secondary accumulator to increase from the preselected pressure, then when the vessel movement begins to cause the pressure in the primary accumulator to decrease, returning fluid from the secondary accumulator to the primary accumulator until the preselected pressure in the secondary accumulator is again reached.

* * * * *